United States Patent
Tang et al.

(10) Patent No.: US 8,244,603 B1
(45) Date of Patent: Aug. 14, 2012

(54) SYSTEM AND METHOD FOR INTEGRATED STOWING AND PICKING IN A MATERIALS HANDLING FACILITY

(75) Inventors: Jen-Chieh Tom Tang, Bellevue, WA (US); Srinivas Palla, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 199 days.

(21) Appl. No.: 12/705,908

(22) Filed: Feb. 15, 2010

(51) Int. Cl.
*G06Q 10/00* (2006.01)

(52) U.S. Cl. ............... 705/28; 705/7.12; 414/222.07

(58) Field of Classification Search ............... None
See application file for complete search history.

(56) References Cited

U.S. PATENT DOCUMENTS

| | | | |
|---|---|---|---|
| 5,385,243 A | 1/1995 | Jackson et al. | |
| 5,977,501 A | 11/1999 | Werkheiser et al. | |
| 6,339,764 B1 | 1/2002 | Livesay et al. | |
| 6,622,127 B1 * | 9/2003 | Klots et al. | 705/28 |
| 7,055,741 B2 | 6/2006 | Bong et al. | |
| 7,084,365 B2 | 8/2006 | Whitnable | |
| 7,331,471 B1 | 2/2008 | Shakes et al. | |
| 7,504,949 B1 * | 3/2009 | Rouaix et al. | 340/572.1 |
| 7,941,244 B2 | 5/2011 | Somin et al. | |
| 7,984,809 B1 * | 7/2011 | Ramey et al. | 209/546 |
| 2002/0133387 A1 | 9/2002 | Wilson et al. | |
| 2005/0067318 A1 | 3/2005 | Cesario | |
| 2005/0149226 A1 | 7/2005 | Stevens et al. | |
| 2009/0081008 A1 * | 3/2009 | Somin et al. | 414/222.07 |

* cited by examiner

*Primary Examiner* — Luna Champagne
(74) *Attorney, Agent, or Firm* — Robert C. Kowert; Meyertons, Hood, Kivlin, Kowert & Goetzel, P.C.

(57) ABSTRACT

Various embodiments of a system and method for integrated stowing and picking in a materials handling facility may include a process control component for monitoring processes within the materials handling facility in order to implement opportunistic picking and stowing. To implement an opportunistic pick, the process control component may determine that an agent has stowed a unit at a respective inventory location. The process control component may determine that the inventory location (or a nearby inventory location) includes a unit designated to be picked and may issue an instruction to opportunistically pick that unit. To implement an opportunistic stow, the process control component may determine that an agent has picked a unit from a respective inventory location. The process control component may determine that a conveyable receptacle utilized by the agent includes a unit that is designated to be stowed and may issue an instruction to opportunistically stow that unit.

45 Claims, 8 Drawing Sheets determining that a first unit has been picked from a given inventory location of a materials handling facility that includes multiple inventory locations (the first unit may be placed in a receptacle of multiple receptacles subsequent to being picked)
602

in response to that determination, evaluating contents of the multiple conveyable receptacles to determine whether the multiple conveyable receptacles include a unit designated to be stowed into inventory
604

in response to determining that the plurality of receptacles comprise a particular unit designated to be stowed into inventory, generating an instruction to stow the particular unit into a particular inventory location
606

*FIG. 6*

SYSTEM AND METHOD FOR INTEGRATED STOWING AND PICKING IN A MATERIALS HANDLING FACILITY

BACKGROUND

Electronic marketplaces (e.g., Internet- or web-based marketplaces) have become legitimate alternatives to traditional "brick and mortar" retail stores. For instance, consumers may visit a merchant's website to view and/or purchase goods and services offered for sale by the merchant (and/or third party merchants). In many cases, consumers appreciate the convenience and simplicity of the shopping experience provided by electronic marketplaces. For example, a consumer may quickly browse an electronic catalog (e.g., via a web browser) and select one or more items from the catalog for purchase. Such items may be shipped directly to the consumer thereby relieving the consumer of the inconvenience of traveling to a physical store.

Some electronic marketplaces include large electronic catalogs of items offered for sale. Distributors that operate such marketplaces may process inventory of items in one or more facilities (e.g., warehouses, distributions centers, etc.). Such a facility may be staffed with agents responsible for performing a variety of duties within the facility, such as receiving items into inventory and preparing items for shipment. The overhead costs associated with the facility (e.g., the aggregate cost of agent labor) are often passed to consumers as some component of the final price of a product. Reducing the final price of a product is one way in which merchants gain a competitive advantage over other merchants in the marketplace; reducing the overhead costs associated with a distribution facility (e.g., the aggregate cost of agent labor) is one way in which merchants may reduce the final price of a product.

BRIEF DESCRIPTION OF THE DRAWINGS

FIG. 6 illustrates a flowchart of an example method including a unit pick followed by an opportunistic unit stow, according to some embodiments.

Figure 1:
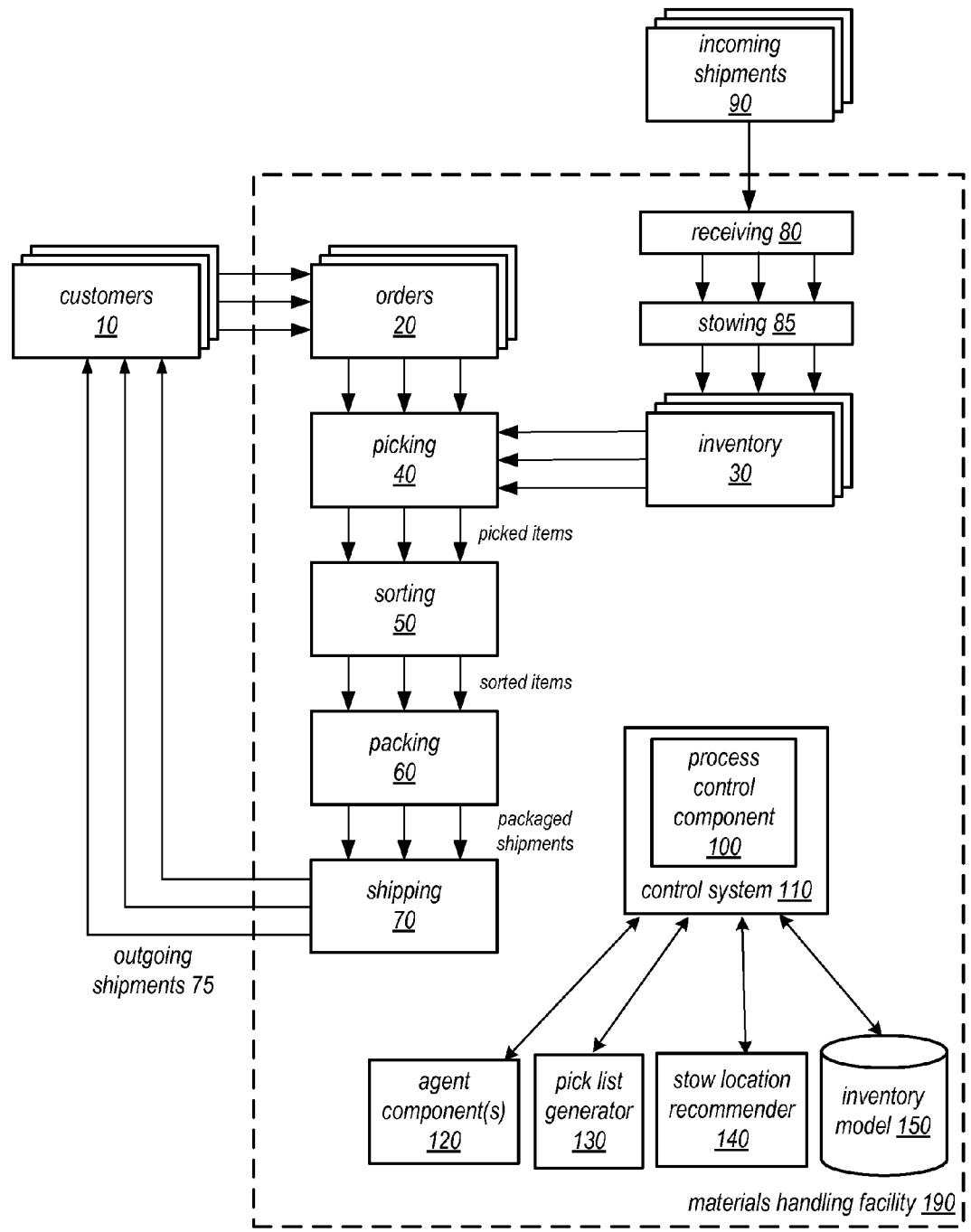
FIG. 1 illustrates a logical representation of a materials handling facility as well as multiple system components, according to some embodiments.

While the system and method for integrated stowing and picking in a materials handling facility is described herein by way of example for several embodiments and illustrative drawings, those skilled in the art will recognize that the system and method for integrated stowing and picking in a materials handling facility is not limited to the embodiments or drawings described. It should be understood, that the drawings and detailed description thereto are not intended to limit the system and method for integrated stowing and picking in a materials handling facility to the particular form disclosed, but on the contrary, the intention is to cover all modifications, equivalents and alternatives falling within the spirit and scope of the system and method for integrated stowing and picking in a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for integrated stowing and picking in a materials handling facility are described. Such embodiments may include a process control component configured to control aspects of one or more integrated stowing and picking process. An integrated stowing and picking process may integrate some or all aspects of a stowing process, which generally includes conveying received units to inventory storage locations, with a picking process, which generally includes removing units from inventory storage locations. Examples of stowing processes and picking process are described in more detail below. The integrated stowing and picking process described herein may be configured differently in various embodiments. In some embodiments, the integrated stowing and picking process may be configured primarily as a stowing process with opportunistic picking (which may be referred to herein as a "stow-pick process"). In other embodiments, the integrated stowing and picking process may be configured primarily as picking process with opportunistic stowing (which may be referred to herein as a "pick-stow process"). In yet other embodiments, the integrated stowing and picking process may be configured as some combination of the aforesaid processes (which may be referred to herein as a "mixed stow-pick process").

The process control component and the integrated stowing and picking process of various embodiments may reduce the aggregate labor required for stowing and picking in a materials handling facility. For instance, for an agent performing a stowing process, a significant portion of that agent's labor time may consist of traveling within the materials handling facility to stow units at different locations in inventory. Likewise, for an agent performing a picking process, a significant portion of that agent's labor time may consist of traveling within the materials handling facility to pick units from different locations in inventory. A given materials handling facility may include multiple agents, each of which may perform a stowing or picking process as part of their duties. Accordingly, a significant portion of the aggregate labor for a materials handling facility may include the aggregate travel time of agents within the materials handling facility.

Typically, an agent's labor time (e.g., measured in man hours) is a component of the overhead costs of the materials handling facility. Various embodiments may reduce these costs by reducing the aggregate labor time required to perform a given quantity of work. For instance, work may be quantified by a quantity of stows and/or picks performed by agents. In one example, instead of assigning some agents to perform stowing processes and other agents to perform picking processes, various embodiments may enable one or more agents to perform both picking and stowing functions in the same process. In an example of a stow-pick process, when an agent stows a unit at a particular inventory location, the process control component described herein may be configured to determine whether that inventory location (or a nearby inventory location) includes a unit that is to be picked. If the process control component determines that there is a unit to be picked from that inventory location (or a nearby inventory location), the process control component may be configured to direct the agent to pick that unit. In this way, the agent may perform an additional unit of work (e.g., a pick) without traveling to another inventory location (or without traveling very far in the case of the pick being located in a nearby inventory location). In the aggregate, such techniques may decrease the quantity of labor time utilized to perform a given quantity of work (e.g., a given quantity of stows and/or picks). In various embodiments, this may represent a cost savings to the entity operating the materials handling facility.

In various portions of this description, the term "item" may refer to a particular type of item and the term "unit" may refer to a particular instance of an item. For instance, an item might refer to a particular brand and model of a radio, and multiple units of that same radio might be stocked as inventory within a materials handling facility. Furthermore, as used herein, the term agent may refer to a human agent or a machine agent (e.g., an automated or robotic agent).

Materials Handling Facility

FIG. 1 illustrates a logical representation or view of the operation of a materials handling facility 190 in which embodiments of the system and method for integrated stowing and picking in a materials handling facility may be implemented. In various embodiments, a materials handling facility may include one or more facilities that process, store, and/or distribute units of items including but not limited to warehouses, distribution centers, hubs, fulfillment centers, nodes in a supply chain network, shipping facilities, stock storage facilities, or any other facility configured to process units of items. For example, this Figure may illustrate an order fulfillment center of a product distributor. Multiple customers 10 may submit orders 20 to the product distributor, where each order 20 specifies one or more units from inventory 30 to be shipped to the customer that submitted the order. To fulfill the customer orders 20, the one or more units specified in each order may be retrieved, or picked, from inventory 30 (which may also be referred to as stock storage) in the materials handling facility, as indicated at 40. Picked units may be delivered or conveyed, if necessary, to one or more stations in the materials handling facility for sorting 50 into their respective orders, packing 60, and finally shipping 70 to the customers 10. In various embodiments, picked units may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 110). A picked, packed and shipped order does not necessarily include all of the units ordered by the customer; an outgoing shipment (e.g., outgoing shipments 75) to a customer may include only a subset of the ordered items available to ship at one time from an inventory storage location.

A materials handling facility may also include a receiving 80 operation for receiving shipments of stock (e.g., units of inventory items) at the materials handling facility. These shipments may be acquired from one or more sources (e.g., vendors). The process of placing the received stock into stock storage (e.g., inventory 30) is illustrated as stowing 85. In various embodiments, stowing may include stocking one or more items in one or more inventory storage areas, such as described in more detail with respect to FIG. 2. Stowing 85 may also be referred to as a stock process or stocking. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Example System Components

In addition to control system 110, the materials handling facility may also include a process control component 100 configured to control one or more integrated stowing and picking processes. While process control component 100 is illustrated as a component of control system 110, the process control component may be separate from the control system in some embodiments. The control system and/or the process control component may be configured to communicate with one or more agent components 120, a pick list generator 130, a stow location recommender 140 and a data store including an inventory model 150, each of which are described in more detail below. In various embodiments, process control component 100 and the other elements described above may be implemented within materials handling facility 190 or remotely within another facility not illustrated.

In various embodiments, agent component(s) 120 may be mobile communication devices or other electronic devices that may be associated with agents performing work within the materials handling facility. In some embodiments, an agent component 120 may be implemented by a computer system, such as that of FIG. 7 described below. In various embodiments, agent components 120 may be mobile or handheld devices that are carried by agents within the materials handling facility. Agent components 120 may communicate with control system 110 to send and receive information or commands, as described in more detail below. In various embodiments, units within the materials handling facility may include or may be labeled with one or more identifiers (e.g., barcodes, stock keeping units or "SKUs", etc.). These identifiers may be specific to a particular item type (e.g., a particular model of a television) or specific to a particular unit of that item type (e.g., a particular unit of that television). Agent components may be configured to read (or "scan") these identifiers utilizing various components including but not limited to optical scanners (e.g., to scan barcode identifiers) or radio frequency identifier (RFID) scanners.

In various embodiments, pick list generator 130 may generate one or more pick lists that specify multiple units (and associated inventory locations) to be picked by an agent of the materials handling facility. In various embodiments, pick lists may also specify an order in which units are to be picked. This ordering may in some cases be generated by the pick list generator such that an agent is instructed to traverse a particular pick path (or simply "path") when picking items from inventory. In some cases, pick paths may be generated to maximize efficiency of an agent's movement through the materials handling facility. For instance, pick lists may avoid directing an agent to geographical diverse locations of the materials handling facility (e.g., different floors within the facility) during the same pick session. In various embodiments, pick lists may be generated to maximize pick density (e.g., quantity of picks per unit of time or quantity of picks per unit of distance traveled by an agent). For instance, a pick list that instructs an agent to pick items that are relatively close to each other may provide a higher pick density than a pick list that instructs an agent to pick items that are located in locations of the materials handling facility that are separated by large distances and/or travel times.

In various embodiments, stow location recommender 140 may recommend or direct an agent to stow a unit in a particular inventory location. In one example, an agent may identify a unit by scanning the unit with an agent component 120 to determine an identifier associated with that unit or item (as described above). The agent component 120 may pass such identifier to stow location recommender 140, either directly or through control system 110. In response, stow location recommender 140 may provide an indication of an inventory location in which to stow the unit, either directly to the agent component or through the control system.

Inventory model 150 may include a virtual representation of inventory of the materials handling facility stored within memory of a data store. In various embodiments, such a data store may be configured as a database, as one or more mass storage devices (e.g., physical disks, logical volumes, etc.) configured to store data blocks or files, or in any other suitable configuration for data storage. The inventory model may be configured to indicate the inventory units within the materials handling facility as well as the respective locations of such units. These locations may be any location within the materials handling facility. In some embodiments, one or more unit locations may be a particular bin of a storage module. An example storage module might be a shelving unit and a particular bin might be a slot on one of the shelves of the shelving unit (e.g., each shelf might be subdivided into multiple bins using shelf dividers). In various embodiments, bins may include multiple units, which may be homogeneous (e.g., a bin that includes units of the same item) or heterogeneous (e.g., a bin that includes at least some units of different items). Note that bins are just one example of an inventory location; in various embodiments, other types of designations may be used for inventory locations. For instance, the materials handling facility may in some embodiments be mapped with a two or three dimensional coordinate system, and the locations of inventory units may be specified by coordinates of such a coordinate system.

In various embodiments, control system 110 (including process control component 100) may track inventory based on input from one or more of agent component(s) 120. For instance, as agents move units from one location to another location (during stowing, picking, or some other operation), such movements may be recorded with agent components 120 utilized by the agents. For instance, as an agent moves an item from a first location to a second location, an agent may scan the item out of the first location by scanning the first location and the unit and/or may scan the item into the second location by scanning the second location and the unit. Such scanning may include electronically obtaining an identifier for the unit and the location from where the unit is being taken or the location to which the unit is being moved. (In some cases, the location from which a unit is removed need not be scanned. Instead, the control system may determine or infer the location from which a unit is removed based on the unit's last known location as recorded by the control system in inventory model 150.) For example, such scanning may include obtaining an identifier via an optical scanner (e.g., bar code scanner) or RFID scanner. In response, the control system may generate a stored data record (e.g., a record in inventory model 150) indicating the unit has left the corresponding location. A similar process may be performed when placing the unit at its new location. For example, an agent may scan an item and scan the location to which that item is being placed (e.g., a location or bin in stock storage). In a similar manner as that described above, the control system may generate a stored data record indicating the unit has arrived at the new location. In this manner, control system 110 may in various embodiments track the location of a given unit throughout that unit's entire lifecycle in the materials handling facility (e.g., from receiving 80 to shipping 70). In some cases, the above-described tracking of units may be performed by an inventory management module, which may be a component of control system 110 or a separate component configured to communicate with control system 110.

In some cases, control system 110 may utilize automated devices or systems to track inventory within the materials handling facility. For instance, as units move from one location to another within the materials handling facility (e.g., on a conveyance mechanism or cart), automated devices, such as optical or RFID scanners controlled by a computer system, may electronically obtain identifiers of units during such movement (e.g., by scanning an optical identifier or RFID tag). Such information may be collected by control system 110 and/or an inventory management component in order to track inventory units within the materials handling facility.

Stowing and Picking

Figure 2:
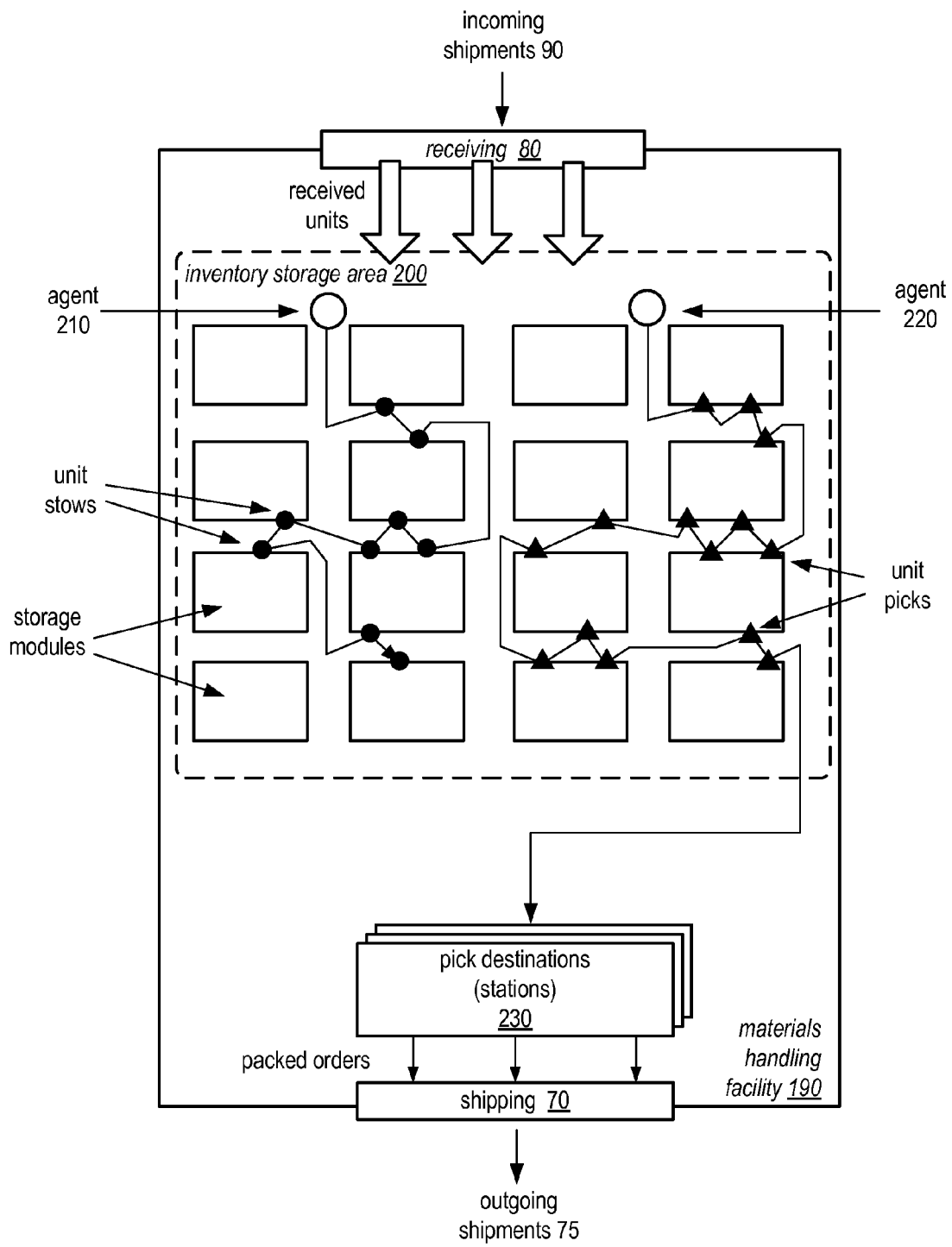
FIG. 2 illustrates examples of a picking process and a stowing process in a materials handling facility, according to some embodiments.

FIG. 2 illustrates examples of stowing and picking processes within a materials handling facility according to various embodiments. As described above, a materials handling facility may include one or more receiving 80 operations for receiving shipments 90 of stock from various vendors. For example, an order procurement system may issue purchase orders for various items to one or more vendors in order to replenish inventory 30, which may be stored within inventory storage area 200. Units of ordered items may arrive at receiving 80 as incoming shipments 90 delivered by a shipment carrier. In other cases, incoming shipments 90 may represent items transferred from another materials handling facility or another node (e.g., warehouse, materials handling facility, etc.) in the fulfillment network of the distributor that owns and/or controls materials handling facility 190.

As used herein, the term stowing may include the process of moving a unit into an identifiable location within inventory storage area 200. In a stow process, units may be sourced from a variety of location including but not limited to a designated receiving area of the materials handling facility (e.g., a receiving dock, receiving lanes near a receiving dock, etc.). In some cases, agents in the materials handling facility may place received units at an intermediate location within inventory storage area 200; this type of intermediate location may be referred to as a drop zone. In these cases, agents performing a stowing process may source units from such intermediate locations.

In various embodiments, inventory storage area 200 may include multiple locations with varying levels of granularity. As illustrated, in some embodiments, inventory storage area 200 may include multiple storage modules (e.g., shelving units or some other type of storage unit) that each include multiple distinct areas (e.g., multiple shelves). In some cases, each of such areas may be further divided into distinct locations (e.g., different slots on a shelf), each of which may represent an identifiable portion of inventory storage area 200. In other cases, dividing inventory storage area 200 into multiple identifiable inventory locations may be implemented in other manners. In some cases, an identifiable location of inventory storage area 200 may be referred to as a particular bin (e.g., a slot, container, or other defined area) of multiple bins in inventory storage area 200. In various embodiments, the inventory model 150 described above may include a record of each location within inventory storage area 200 and each respective unit stored at that location. For instance, for each bin of multiple bins in inventory storage area 200, inventory model 150 may specify one or more units of items stored in that bin.

In the illustrated embodiment, agent 210 is performing an example stowing process and agent 220 is performing an example pick process, each of which is described in more detail below. Each agent may utilize a receptacle cart 310 (FIG. 3) including one or more receptacles in accordance with that agent's respective process. The use of such a receptacle cart is described in more detail with respect to FIG. 3. In the illustrated embodiment of FIG. 2, agent 210 may source received units from various locations (e.g., receiving lanes, drop zones, etc.) and stow such units into inventory. In the illustrated example stow process, the darkened circles denote an instance of the stowing of a unit, which may mean an agent has placed a unit at or into a particular inventory location of inventory storage area 200 (e.g., in a particular bin). In various embodiments, this placement is recorded by an agent component 120, which may provide an indication of such placement to the control system 110. Control system 110 may store an indication of the stow (e.g., the respective unit's new location in inventory) within inventory model 150.

In various embodiments, stows may be performed randomly (e.g., an agent may select where items are stowed) or with assistance from the control system (e.g., the control system or related component may recommend a location for stowing). In a random stow process, the agent may determine where units are to be stowed, such as by inspecting the illustrated storage modules for available space (e.g., bins that include the requisite space to hold one or more items). An agent may stow a unit in any available space that he finds, according to some embodiments. In some cases, one or more constraints may be placed on a random stow process. For instance, control system 110 and/or agent components 120 may enforce a constraint on a random stow process such that the quantity of unique item types within a given inventory location (e.g., a given bin) cannot exceed a specified maximum quantity. In one case, an example constraint may specify that no more than six unique types of items may reside in a given bin. In cases where the control system recommends stow locations, the control system may direct an agent to an inventory location in which to stow an item. For example, an agent may utilize his agent component 120 to scan an item to be stowed in order to determine the unit's identifier, which may be provided by the agent component to control system 110. Control system 110 may query stow location recommender 140 with the identifier of the item. In response to the query, the stow location recommender 140 may provide the control system with a particular inventory location in which the unit is recommended to be stowed. This particular inventory location may be selected by the stow location recommender based on the agent's proximity to that location, one or more properties of the unit to be stowed (e.g., size, weight, etc.), and/or one or more properties of the selected location (e.g., bin capacity, available space in the bin, etc.).

In various embodiments, the pick process performed by agent 220 may be performed in accordance with one or more pick lists (e.g., lists that may specify units to be picked and the inventory locations of such units). In various embodiments pick lists may be generated by pick list generator 130. A generated pick list may be provided to control system 100, which may provide the pick list to an agent 220's respective agent component. Agent 220 may view one or more portions of the pick list on his agent component 220. Agent 220 may pick units from the inventory locations indicated by the pick list. In the illustrated embodiment, an instance of a pick at an inventory location is denoted by a darkened triangle within inventory storage area 200. In various embodiments, agent 220 may provide picked units to one or more pick destinations 230, which may include stations for performing any of the processes described above, such as sorting 50 and packing 60. Packed orders may be provided to shipping 70 to be shipped as outgoing shipments 75.

Receptacles and Receptacle Carts

Figure 3:
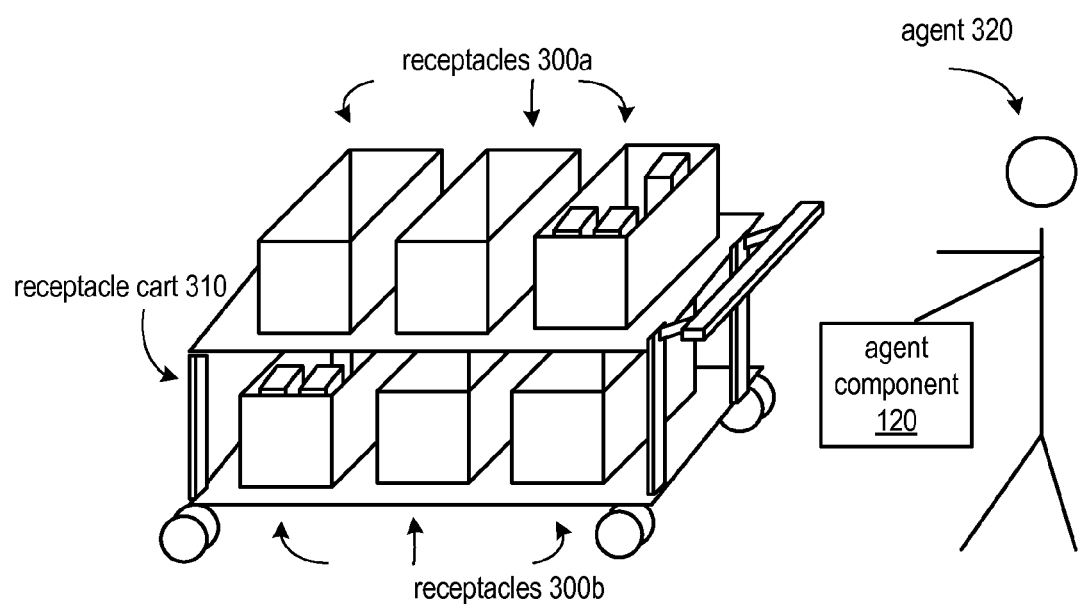
FIG. 3 illustrates a receptacle cart including multiple receptacles that may be utilized for stowing units into inventory and picking units from inventory, according to some embodiments.

As described above, various embodiments may provide an integrated stowing and picking process that may integrate some or all aspects of a stowing process (e.g., the process performed by agent 210), which generally includes conveying received units to inventory storage locations, with a picking process (e.g., the process performed by agent 220), which generally includes removing units from inventory storage locations for further processing in the materials handling facility. FIG. 3 illustrates a receptacle cart 310 and respective receptacles 300a and 300b (collectively referred to as receptacles 300) that may be utilized to perform an integrated stowing and picking process.

In various embodiments, agent 320 may be an employee of the materials handling facility with a push cart 310 configured to hold a plurality of storage bins or totes, where each tote (or, alternatively, each of one or more compartments within one or more of the totes) is one of receptacles 300. The number and arrangement of receptacles 300 on the cart may vary from that shown. The receptacles 300 may be mobile, so the receptacles 300 may be removed from or added to a cart 310, moved to different carts, rearranged on a cart, etc. Agent 320 may interact with a corresponding agent component 120 (as described above), which may be a handheld device, a device worn by or attached to the agent, or a device integrated into or mounted on receptacle cart 310 in various embodiments.

Agent component 120 may be configured to convey instructions to agent 320 as to what actions to perform within the materials handling facility (e.g., picking, stowing, or both). For example, to perform picking, agent component 120 may receive from a materials handling facility control system a pick list indicating items to be picked from bins or locations in inventory, which may be referred to as storage modules, and may present the items to pick and the storage modules to agent 320 via a display portion of the device such as a screen. Agent component 120 may also receive and display a list of one or more destinations for the picked units in the materials handling facility from the control system. Agent 320 may collect the receptacles 300 for the indicated destinations and place them on the cart. Any of a variety of methods may be used to assign receptacles 300 to destinations. In one embodiment, each receptacle 300 may be marked or tagged with a bar code, RFID tag, serial number, and/or other designation (including proprietary designations) that uniquely identifies the receptacle 300 among the receptacles in the materials handling facility. Note that this unique identifier may be used by the control system to associate the receptacle 300 with units located within the receptacle. In one embodiment, agent 320 may select a receptacle 300 from a repository of receptacles in the materials handling facility, and the receptacle's unique identifier may be scanned or otherwise entered in the agent component 120 by agent 320. The control system may then associate that particular receptacle 300 with a particular destination (e.g., a sorting station).

In response to receiving instructions to pick various items, agent 320 may navigate receptacle cart 310 to a first indicated storage module (or, alternatively, to the closest indicated storage module if the indicated storage modules are not specifically ordered by the pick lists). Once at an indicated storage module, agent 320 may select a unit of an indicated item from the indicated storage module. For example, agent 320 may retrieve an item from a bin, pallet, chute, or other configuration of storage module. In some cases, agent 320 may also inspect the condition of the item, and may select an item only if it is in suitable condition (e.g., is clean, undamaged, unopened, has an appropriate expiration date, or satisfies some other set of criteria). Items in inventory may be marked or tagged with a bar code, radio frequency identification RFID tag, Universal Product Code (UPC), Stock-Keeping Unit (SKU) code, serial number, and/or other designation (including proprietary designations) to facilitate materials processing facility operations including, but not limited to, picking, sorting and packing. These designations, or codes, may identify items by type, and/or may identify individual units within a type of item. In one embodiment, once a unit has been picked, agent 320 may scan or otherwise enter the code for the picked unit in agent component 120. Alternatively, the agent may select a button or other mechanism on the agent component 120 corresponding to the item to indicate that the item was picked. Agent component 120 may then send a message to a control system, such as control system 110, indicating the picked item. Agent 320 may then repeat the pick process for each item on the list of items to be picked.

In response to receiving an instruction to stow an item at a particular location (e.g., a location recommended by stow location recommender 140), agent 320 may navigate receptacle cart 320 to that location, remove a unit from a receptacle of the cart, and place the item in the particular location (e.g., a bin). These actions may be recorded by agent component 120 and provided to control system 110, which may update inventory model 150 to indicate that the location now includes the stowed unit.

Receptacle cart 310 may be utilized in any of the integrated stowing and picking processes described herein. In various embodiments, some receptacles of receptacle cart 310 may be utilized for picking whereas other receptacles of the receptacle cart may be utilized for stowing. In one example embodiment, receptacles 300a may be utilized for picking (e.g., items may be placed into receptacles 300a from inventory) and receptacles 300b may be utilized for stowing (e.g., items may be removed from receptacles 300b and placed into inventory). In some cases, picking receptacles and stowing receptacles may be differentiated by one or more physical characteristics, such as by utilizing one color for picking receptacles and a different color for stowing receptacles. In various embodiments, any given receptacle 300 may be repurposed during an integrated stowing and picking process. For instance, control system 110 may determine that a receptacle 300 has been emptied (e.g., all items have been removed from that receptacle by stowing operations) and provide an agent with an instruction (e.g., via agent component 120) to repurpose the receptacle for picking operations. In response, the agent 320 may in some cases perform some modification to the receptacle to indicate that it has been repurposed. For example, a receptacle could include a light that could be turned off or on to indicate the purpose for the receptacle (e.g., off for stow, on for pick). In various embodiments, other modifications or markings are possible and contemplated. In some embodiments, instead of control system 110 providing the agent with an instruction to repurpose the receptacle, the agent may directly monitor the contents of a receptacle and repurpose the receptacle when the receptacle is emptied.

For any items picked by agent 320, the agent may deliver a receptacle 300 including such picked items on cart 310 to an assigned destination (e.g., a sorting station). The control system may communicate with agent 320 via agent component 120 to direct the agent to the destination for each receptacle 300. In one embodiment, the materials handling facility may include a conveyance mechanism, such as a conveyor belt, onto which the agent may induct the completed receptacles 300. The conveyance mechanism may then deliver the receptacles 300 to the stations assigned as destinations in the materials handling facility. In one embodiment, the conveyance mechanism may be configured to automatically deliver receptacles 300 to the correct destinations (stations) as directed by the materials handling facility control system. For example, the conveyance mechanism may scan or otherwise detect a unique identifier of each receptacle 300, and the control system may direct the conveyance mechanism as to which destination the receptacle 300 is to be delivered. In one embodiment, agents at the stations may scan or otherwise enter receptacles 300 on the conveyance mechanism to determine, as directed by the control system, if the receptacles 300 are assigned to their station.

After completion of processing of the items in a receptacle 300 at a station, the items may be delivered to another station for further processing. For example, the items may be sorted into their respective orders at a manual or automated sorting station, and then delivered to a packing station or stations. As another example, the items may be gift-wrapped at a gift-wrapping station, and then delivered to a sorting station to be sorted into their respective orders. In one embodiment, the processed items may be placed back into the receptacle 300, or alternatively into a different receptacle or receptacles 300, which may then be directed to the next station or stations for the items in the receptacle(s) 300 by the control system.

Numerous different embodiments of agent component 120 are possible and contemplated. In some embodiments, agent component 120 may include a portable general-purpose computer system configured to execute an operating system and one or more applications, while in other embodiments, agent component 120 may include an embedded computer system configured to execute customized software applications. In various embodiments, agent component 120 may support numerous different interface mechanisms, such as video displays of various sizes and resolutions, audio input/output capabilities (e.g., for voice communication), optical (e.g., bar code) scanning devices, RFID detectors, wireless or wired network interfaces, or various combinations of these, which may be directly integrated within agent component 120 or implemented by separate devices interfaced with agent component 120.

In some embodiments, the actions of agent 320 may be partially or completely performed by an autonomous robot. For example, in some embodiments both item picking and transportation may be performed robotically, whereas in other embodiments items may be picked by human employees while robotic push carts 310 operate independently of the human pickers. Alternatively, push carts 310 may be replaced with other conveyance systems such as such as conveyor belts, track-based carts, AGVs (Automated Guided Vehicles), wheel-mounted shelving units etc., or some agents 320 may carry one or more receptacles 300 without the use of a receptacle cart 310. As noted above, in embodiments employing push carts 310, the configuration of receptacles 300 may vary in various embodiments. For example, push carts 310 may have more or fewer receptacles 300 than shown, and receptacles 300 may be arranged in different fashions, such as by varying the angle at which receptacles 300 are mounted in order to facilitate access to receptacles 300 at various heights on carts 310.

Integrated Stowing and Picking Processes

Figure 4A:
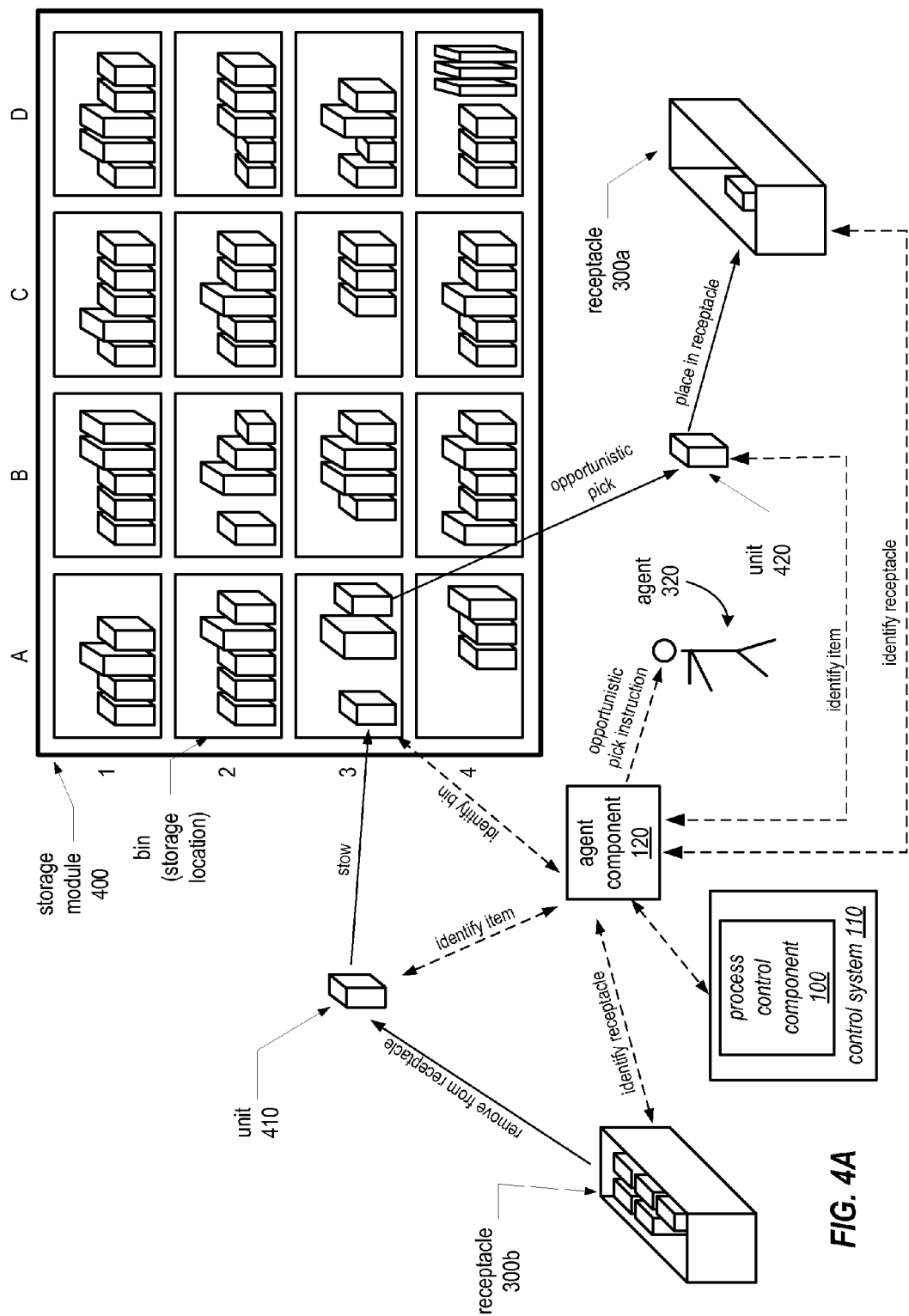
FIG. 4A illustrates a process including a unit stow followed by an opportunistic unit pick, according to some embodiments.
Figure 4B:
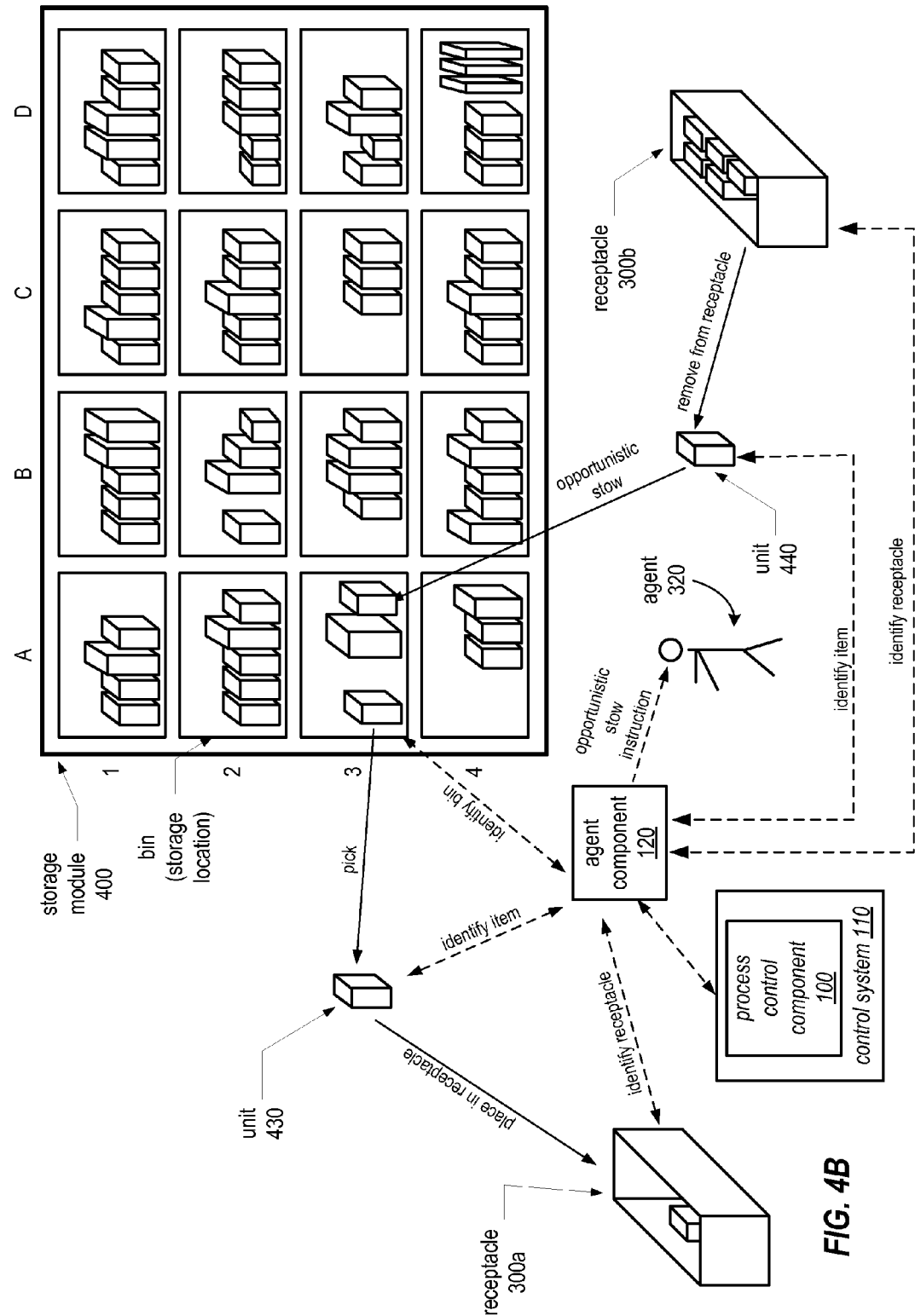
FIG. 4B illustrates a process including a unit pick followed by an opportunistic unit stow, according to some embodiments.

FIGS. 4A-4B illustrate operations of integrated stowing and picking process, according to various embodiments. In FIG. 4A, operations of a stow-pick process are illustrated. In FIG. 4B, operations of a pick-stow process are illustrated. In the illustrated embodiments of FIGS. 4A-4B, receptacle cart 310 is not illustrated for purposes of clarity. Nevertheless, it should be understood that the illustrated receptacles may be receptacles of the same receptacle cart.

In the illustrated embodiment of FIG. 4A, agent 320 may convey receptacles 300 (on cart 310, not illustrated) to a particular storage module 400 to perform a stow. In various embodiments, agent 320 may select this location without assistance from agent component 120, such as might occur during random stow (described above). In other cases, the control system 110 may recommend a stow location (e.g., based on output from stow location recommender 140). The recommended stow location may be provided to the agent via agent component 120. In either case, agent 310 may remove a unit 410 from receptacle 300b (which is designated for stowing in this embodiment) and stow the item into bin A3. (Note that bins may be identified by column and row.) During this process, the agent may identifying the receptacle, identify the item, and identify the bin with the agent component 120 (e.g., via optical or radio scanning of identifiers). This information may be provided by the agent component 120 to the control system 110, which may update inventory model 150 with the new location of unit 410. In various embodiments, some or all of such information may also be provided to process control component 100 of the control system.

Process control component 100 may be configured to evaluate a region of one or more inventory locations to determine whether that region includes one or more units designated to be picked. In various embodiments, pick list generator 130 may be queried by process control component 100 to determine whether a given item is designated to be picked. In some embodiments, the region evaluated by the process control component may include only the location to which the previous unit (e.g., unit 410) was stowed (e.g., bin A3). In other embodiments, the region evaluated by the process control component may include the location to which the previous unit was stowed (e.g., bin A3) and one or more other locations proximate to that location. In the case of bins, these one or more other locations of the region may include bins of the same row as the bin to which the previous unit was stowed (e.g., any bin of row 3), bins of the same column as the bin to which the previous unit was stowed (e.g., any bin of column A), any bin within a certain distance or quantity of bins away from the bin to which the previous unit was stowed (e.g., any bin located one bin away, such as bins A2, A4, B2, B3 and B4), any bin of the same storage module as the bin to which previous unit was stowed (e.g., any bin of storage module 400), some other designation for inventory locations of a region, or some combination thereof. In various embodiments, the region that is to be evaluated for items to be picked may be configurable, such as by a system administrator of the control system.

If the process control component 100 determines that there is not an item designated to be picked from the region described above, the process control component may return an indication of such determination to agent component 120. In various embodiments, agent component 120 may inform agent 320 of such determination or may take no action, in some embodiments.

If the process control component 100 determines that there is an item that is designated to be picked within the region described above, the process control component may issue an opportunistic pick instruction to agent component 120, which may provide the instruction to agent 320 as illustrated. In various embodiments, the opportunistic pick instruction may be displayed on a display of agent component 120. In various embodiments, the opportunistic pick instruction may indicate from which location a unit is to be picked; this indication may be provided on an agent component 120 or on the appropriate bin (e.g., via a light or other illuminated indicator on or near the appropriate bin). In the illustrated embodiment, this location may be bin A3 (e.g., the same location to which the previous unit was stowed. In embodiments where the region evaluated includes other inventory locations (e.g., other bins of storage module 400), the pick instruction may indicate that an item is to be picked from one of such other inventory locations. In response to the instruction, agent 320 may pick the item (as denoted by the illustrated opportunistic pick) from the indicated inventory location (e.g., bin A3) and place the item in a receptacle designated for picked items, as illustrated by the placement of unit 420 into receptacle 300a.

In various embodiments, the process control component may be configured to provide the agent with an indication of the receptacle (e.g., a particular receptacle of the agent's mobile receptacle cart) in which to place an opportunistically picked item. For example, different mobile cart receptacles (e.g., receptacles 300a-300b) may be associated with different destinations within the fulfillment center (e.g., processes or stations for sorting, packing, gift-wrapping, etc.). For an opportunistically picked item destined for a particular destination, the process control component may be configured to provide the agent with an indication to place that item in a particular receptacle that is destined for that particular destination. In some embodiments, this indication may be presented to the agent via the respective agent component 120 (e.g., as part of the opportunistic pick instruction). In other cases, a light or other visual indicator on the appropriate receptacle could be activated by the process control component. In yet another example, the materials handling facility may be equipped with a visual guidance system that may visually indicate the appropriate receptacle (e.g., by illuminating the receptacle with a laser or other type of light) in response to an instruction from the process control component. This type of guidance system may also be utilized to illuminate bins during opportunistic picking, as described above (e.g., to indicate from which storage module bin an item is to be opportunistically picked).

In various embodiments, prior to issuing an opportunistic pick instruction, process control component 100 may perform a check to determine that the agent has access to a pick receptacle. For instance, the process control component 100 may ensure that the agent's receptacle cart includes at least one non-full receptacle designated for picked items. If the agent does not have access to such a receptacle (such as might be the case if all receptacles of the cart are holding items for stowing), the process control component 100 may be configured to withhold the opportunistic pick instruction. In other cases, the process control component 100 may be configured to let the agent specify whether he has access to a receptacle for picked items (e.g., specify via agent component 120).

In various embodiments, the agent component 120 may be utilized to identify the bin from which the unit 420 was opportunistically picked, identify unit 420, and/or identify the receptacle in which unit 420 was placed. In various embodiments, agent component 120 may provide such information to control system 100, which may update inventory model 150 to reflect the new location of the opportunistically picked unit.

Note that the embodiment of FIG. 4A illustrates only one instance of a stow followed by an opportunistic pick. Note that this process may be repeated multiple times in a stow-pick process. Also note that the stow-pick processes that include one or more opportunistic picks may reduce the quantity of labor required in the materials handling facility. For example, note that since agent 320 opportunistically picked unit 420, another agent does not have to be sent from some other portion of the materials handling facility to pick the item. Described in another way, the marginal labor cost of having agent 320 opportunistically pick unit 420 is much lower than the marginal labor cost of having another agent located farther away travel to storage module 400 to perform the pick (e.g., the marginal cost may be lower because agent 320 was already in the vicinity to perform a stow of unit 410).

In various embodiments of a stow-pick process, such as a process including one or more stows followed by one or more opportunistic picks as illustrated in FIG. 4A, receptacles may be repurposed in response to determining that a receptacle is empty. In some embodiments, an agent 320 may determine that a particular receptacle has been emptied by one or more stow operations. In response to such a determination, agent 320 may scan that receptacle with agent 120. In some cases, agent component 120 may provide the agent (via a user interface) a menu of selectable actions to perform with respect to the scanned receptacle. In some embodiments, one of such actions may repurpose the receptacle as a pick receptacle. If the agent selects such action via the agent component 120, the agent component may notify the control system of the receptacle repurposing. In some embodiments, the control system may, for each receptacle, store an indication of that receptacle's designated function (e.g., stow or pick). In embodiments where the control system and/or the process control component monitor the quantity of units within each receptacle, such elements may determine that a particular receptacle is empty, full, or partially full. In cases where a receptacle is determined to be empty, an agent's agent component 120 may notify the respective agent that such receptacle is eligible for unit picking. In some cases, the agent component may prompt the agent to confirm that the receptacle is empty before repurposing that receptacle for picking.

FIG. 4B illustrates a pick followed by an opportunistic stow, each of which may be operations performed in a pick-stow process. In the illustrated embodiment, agent 320 may convey receptacles 300 to storage module 400, such as by transporting the receptacles on receptacle cart 310 described above. In various embodiments, the agent may convey the receptacles to a particular inventory location based on a location indicated by a pick list (described above), such as a pick list generated by pick list generator 130. Agent 320 may pick unit 430 from bin A3 in accordance with the pick list. At picking time, the agent may utilize agent component 120 to identify unit 430, the bin from which unit 430 is picked, and the receptacle 300a to which the unit is being relocated. In various embodiments, agent component 120 may provide such information to control system 110, which may use the information to update inventory model 150 to reflect the new location of unit 430. The receipt of such information by control system 110 may also notify process control component 100 that a pick has been performed.

In response to determining that a pick has been performed, process control component 100 may be configured to determine whether an opportunistic stow is to be performed. To perform such determination, the process control component 100 may determine whether any receptacles of the agent's receptacle cart include items that are eligible to be stowed. In various embodiments, this may be determined by querying the agent through a display of agent component 120 and receiving a response from the agent through an input component of agent component 120; such response may indicate whether any units of the receptacles are to be stowed. In other cases, inventory model 150 may include records that indicate, for each receptacle of an agent's receptacle cart, the units that are located within such receptacle. The inventory model (or some other component of the system) may indicate whether such items are eligible to be stowed. In other cases, the system may rely on the agent to determine which units are eligible to be stowed (e.g., the agent may know that units within a receptacle of a particular color are units that are to be stowed). In some cases, the agent may notify control system 110 (e.g., via agent component 120) that the agent's receptacles include one or more units that are eligible to be stowed.

In the illustrated embodiment, receptacle 300b includes one or more items that are eligible to be stowed in inventory. Process control component 100 may be configured to issue an opportunistic stow instruction to agent 320 (via agent component 120); the opportunistic stow instruction may instruct the agent to stow a unit from receptacle 300b into the bin location from which the previous unit was picked (or into a nearby bin location). In various embodiments, the process control component may determine that there is room for a unit to be stowed within such inventory location through a variety of techniques. In some embodiments, process control component 100 may determine that space is available in an inventory location due to a recent pick. For instance, process control component may infer that because an item was recently picked from bin A3, bin A3 likely contains available space. In other embodiments, process control component 100 may determine that there is available space in the bin based on that particular bin's capacity and the current inventory in that bin (e.g., as indicated by inventory model 150). In response to receiving the opportunistic stow instruction, agent 320 may remove unit 440 from receptacle 300b. In some cases, the particular unit 440 and/or receptacle 300b may be specified by the opportunistic stow instruction. In other cases the opportunistic stow instruction may require that the particular unit 440 and/or receptacle 300b be selected by agent 320. In cases, where unit 440 is specified by the opportunistic stow instruction, the process control component 100 may select that particular unit in response to determining that the unit will fit within the selected bin, which may be determined based on the physical characteristics (e.g., height, width, depth, volume, etc) of the unit, the physical characteristics of the bin, and/or the portion of the bin occupied by other units (if any). Agent 320 may stow unit 440 in the bin (or other inventory location) specified by the opportunistic stow instruction.

In some embodiments, process control component 100 may be configured to guide the agent to the particular mobile cart receptacle from which to source the item that is to be opportunistically stowed. As described above, different receptacles of the agent's mobile cart could be purposed for stowing or picking. By guiding the agent to the particular mobile cart receptacle from which to source the item that is to be opportunistically stowed, the process control component can reduce agent error (e.g., by preventing an agent from mistakenly stowing an item from a pick receptacle). For instance, as described above, receptacles may be equipped with lights or other visual indicators; the process control component may activate a visual indicator on the appropriate receptacle. In yet another example, the materials handling facility may be equipped with a visual guidance system that may visually indicate the appropriate receptacle (e.g., by illuminating the receptacle with a laser or other type of light)

in response to an instruction from the process control component. The process control component may utilize similar techniques to notify the agent of the bin in which the item is to be stowed (e.g., bins may also be equipped with lights activated by the process control component).

In some embodiments, the opportunistic stow instruction may specify that unit 440 be stowed in another inventory location near the inventory location from which the previous unit (e.g., unit 430) was picked. In one example, process control component 100 may determine that unit 440 will not fit within the inventory location (e.g., bin A3) from which the previous unit (e.g., unit 430) was picked. Process control component 100 may evaluate a region of inventory locations proximate to the inventory location from which the previous unit was picked. In various cases, this region may or may not include the inventory location (e.g., bin A3) from which the previous unit was picked. In some embodiments, the region evaluated by the process control component may include one or more other locations proximate to the pick location (e.g., proximate to bin A3). In the case of bins, these one or more other locations of the region may include bins of the same row as the bin from which the previous unit was picked (e.g., any bin of row 3), bins of the same column as the bin from which the previous unit was picked (e.g., any bin of column A), any bin within a certain distance or quantity of bins away from the bin from which the previous unit was picked (e.g., any bin located one bin away, such as bins A2, A4, B2, B3 and B4), any bin of the same storage module as the bin from which the previous unit was picked (e.g., any bin of storage module 400), some other designation for inventory locations of a region, or some combination thereof. In various embodiments, the region that is to be evaluated may be configurable, such as by a system administrator of the control system.

In various embodiments, agent 320 may perform the opportunistic stow by removing unit 440 from receptacle 300*b* and stowing the item in the inventory location specified by the opportunistic stow instruction, as illustrated. In various embodiments, agent 320 may use agent component 120 to identify that unit, the bin to which that unit is stowed and/or the receptacle from which the unit was removed. Such information may be provided to control system 110 by agent component 120; the control system may update inventory model 150 to reflect the new location of unit 440.

In various embodiments, during or around the time of the opportunistic stow, the agent may visually identify available space in inventory locations near the location of the opportunistic stow. Various embodiments provide the agent with an opportunity to stow additional items in these inventory locations should the agent decide to do so. In yet other cases, the process control component could notify the agent of such inventory locations. Whether driven by the agent or the process control component, these additional stows could be recorded by the process control component (e.g., similar to the manner in which the stow of FIG. 4A is recorded by the process control component).

As described above, in various embodiments, the opportunistic pick of FIG. 4A may be utilized for a stow-pick process (e.g., a process in which an agent is primarily stowing yet performs opportunistic picks). Likewise, in various embodiments, the opportunistic stow of FIG. 4B may be utilized for a pick-stow process (e.g., a process in which an agent is primarily picking yet performs opportunistic stows). In a mixed stow-pick process performed by an agent, both opportunistic picks and opportunistic stows may be utilized. In such embodiments, instead of being assigned to perform only one of stowing or picking, an agent may be assigned to performing some combination of the two. In these embodiments, an agent may be directed to pick locations specified by a pick list as well as to stow locations based on locations specified by stow location recommender 140. For each stow performed in a mixed stow-pick process, process control component 100 may be configured to determine whether an opportunistic pick may be performed (e.g., as described regarding FIG. 4A). Likewise, for each pick performed in a mixed stow-pick process, process control component 100 may be configured to determine whether an opportunistic stow may be performed (e.g., as described regarding FIG. 4B). In some embodiments of mixed stow-pick processes, stow location recommender 140 may recommend a bin (or regions of multiple bins) that have large amounts of available space (in which items may be stowed) and/or items designated to be picked (e.g., as identified by pick list generator 130) relative to other bins (or regions of multiple bins) within the materials handling facility. In this way, the process control component 100 may increase the quantity of work (e.g., amount of picks and/or stows) performed by an agent per travel distance or per travel time.

Example Methods

Figure 5:
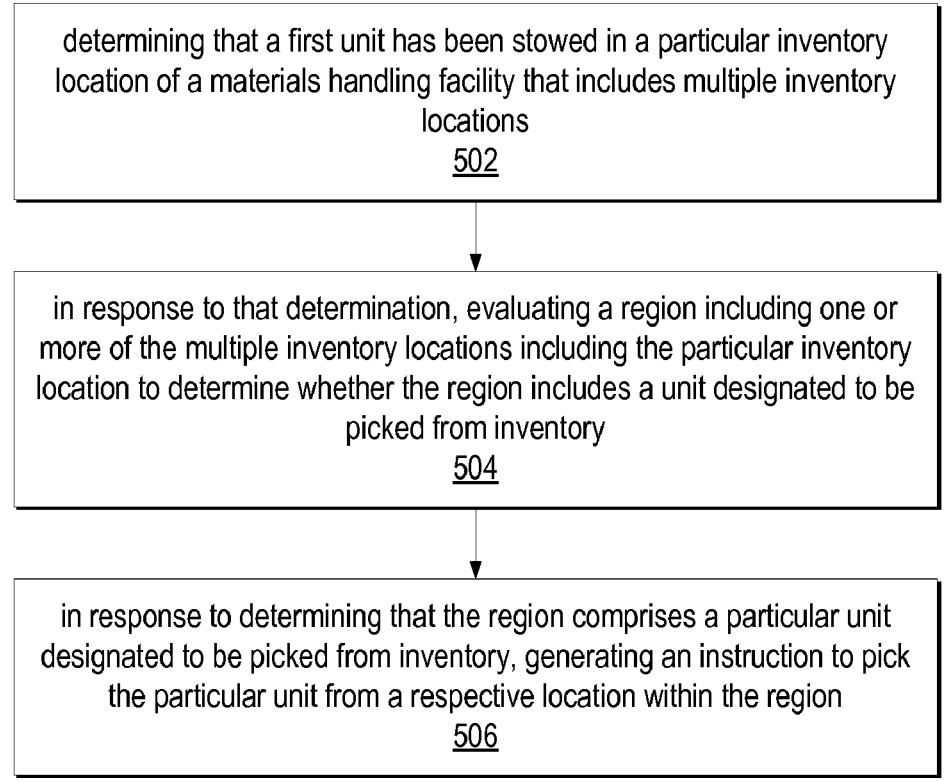
FIG. 5 illustrates a flowchart of an example method including a unit stow followed by an opportunistic unit pick, according to some embodiments.

Various methods may be performed in various embodiments of a system and method for integrated stowing and picking in a materials handling facility. Such methods may include performing any action or functionality described herein. FIGS. 5 and 6 illustrate flowcharts of examples of such methods. In various embodiments, the illustrated methods may be performed by process control component 100 and/or control system 110 described above.

FIG. 5 illustrates a flowchart of an example method for performing an opportunistic unit pick subsequent to a unit stow. For instance, the illustrated method may be similar to actions performed by process control component 100 in the illustrated embodiment of FIG. 4A. As illustrated by block 502, the method may include determining that a first unit has been stowed in a particular inventory location of a materials handling facility that includes multiple inventory locations. One example of such a determination is illustrated in FIG. 4A (e.g., agent component 120 provides control system 110 with information indicating unit 410 has been stowed). In another example, the method may include evaluating an inventory model (e.g., inventory model 150) to determine that the first unit has been stowed in a particular inventory location. As illustrated by block 504, the method may also include, in response to the determination performed at block 502, evaluating a region including one or more of the multiple inventory locations including the particular location to determine whether the region includes a unit designated to be picked from inventory. One example of such a region is described above with respect to FIG. 4A. For instance the region may include the inventory location in which the first unit was stowed and/or one or more inventory locations proximate to the inventory location in which the first unit was stowed (e.g., bins of same storage module, bins of same column or row of storage module, etc.). In one embodiment, performing the determination of block 504 may include determining the units within the region (e.g., by evaluating the records of inventory model 150) and cross referencing such units with one or more lists of units to be picked (e.g., one or more lists provided by pick list generator 130) to determine if a unit of the region coincides with units on the one or more lists. As illustrated by block 506, the method may also include, in response to determining that the region comprises a particular unit designated to be picked from inventory, generating an instruction to pick the particular unit from a respective location within the region. One example of such an instruction is the opportunistic pick instruction generated by process control component 100 and provided to agent 320 via agent component 120, as described above with respect to FIG. 4A.

FIG. 6 illustrates a flowchart of an example method for performing an opportunistic unit stow subsequent to a unit pick. For instance, the illustrated method may be similar to actions performed by process control component 100 in the illustrated embodiment of FIG. 4B. As illustrated by block 602, the method may include determining that a first unit has been picked from a given inventory location of a materials handling facility that includes multiple inventory locations. In various embodiments, the first unit may be placed in a receptacle of multiple receptacles subsequent to being picked. One example of the determination of block 602 is illustrated in FIG. 4B (e.g., agent component 120 provides control system 110 with information indicating unit 430 has been picked). In another example, the method may include evaluating an inventory model (e.g., inventory model 150) to determine that the first unit has been picked from a particular inventory location. As illustrated by block 604, the method may also include, in response to the determination performed at block 602, evaluating contents of the multiple conveyable receptacles to determine whether the multiple conveyable receptacles include a unit designated to be stowed into inventory. One example of such multiple conveyable receptacles includes a group of receptacles on the same receptacle cart, such as described above with respect to FIG. 3. In various embodiments, the method may include evaluating the receptacles of the same receptacle cart (e.g., a receptacle cart utilized by an agent for stowing/picking) to determine whether such receptacles include a unit designated to be stowed in inventory. In various embodiments, this portion of the method may include querying an agent through a display of an agent component (e.g., agent component 120) and receiving a response from the agent; such response may indicate whether any units of the receptacles are to be stowed. In other cases, an inventory model (e.g., inventory model 150) may include records that indicate, for each receptacle of an agent's receptacle cart, the units that are located within such receptacle. The method may include evaluating the inventory model to determine whether the units of the receptacles are eligible to be stowed. As illustrated by block 606, the method may also include, in response to determining that the multiple receptacles include a particular unit designated to be stowed into inventory, generating an instruction to stow the particular unit into a particular inventory location. One example of such an instruction is the opportunistic stow instruction generated by process control component 100 and provided to agent 320 via agent component 120, as described above with respect to FIG. 4B.

Example Computer System

Various embodiments of a system and method for integrated stowing and picking in a materials handling facility, as described herein, may be executed on one or more computer systems, which may interact with various other devices. Note that any component or action described above with respect to FIGS. 1-6 may be implemented via one or more computer systems configured as computer system 900 of FIG. 7, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing process control component 100 (configured as described above) are shown stored within system memory 920. Additionally, data 932 of memory 920 may store any of the data structures (e.g., inventory model 150) described above, in some embodiments. In some embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 (which may implement process control component 100) and other devices (e.g., control system 110, agent components 120, pick list generator 130, stow location recommender 140, and/or data store storing inventory model 150) attached to a network 985 or between nodes of computer system 900. Note that any of such devices may also be implemented by a computer system similar to computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Any of the computer systems, devices, component or elements described herein may communicate via such networks.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
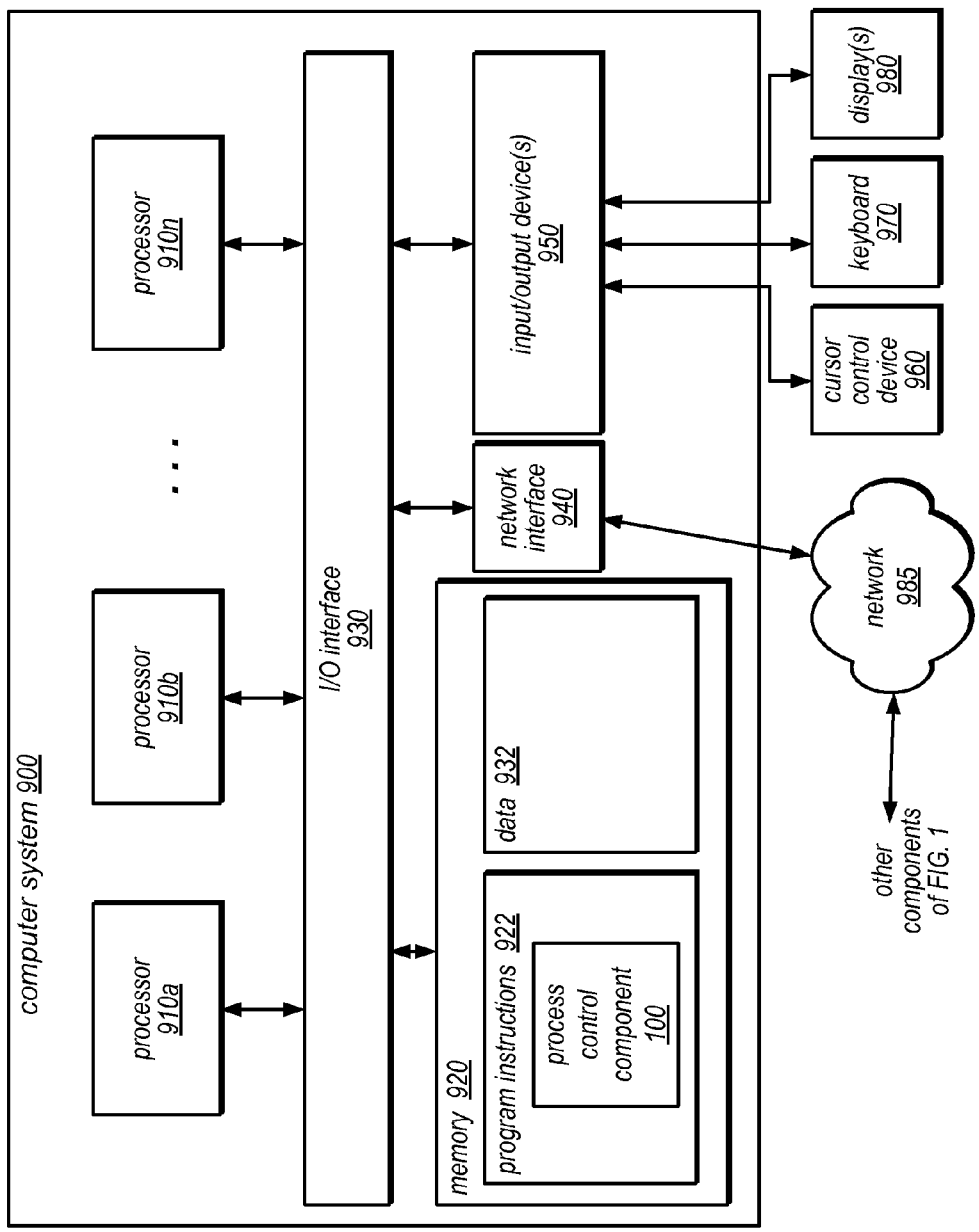
FIG. 7 illustrates a computer system suitable for implementing various elements of the system and method for integrated stowing and picking in a materials handling facility.

As shown in FIG. 7, memory 920 may include program instructions 922 configured to implement any element or action described above. In one embodiment, the program instructions may implement the methods described above, such as the processes described above with respect to FIGS. 4A-4B and the methods described above with respect to FIGS. 5 and 6. In other embodiments, different elements and data may be included. Note that data 932 may include any data described above with respect to FIGS. 1-6.

Those skilled in the art will appreciate that computer system 900 is merely illustrative and is not intended to limit the scope of embodiments. In particular, the computer system and devices may include any combination of hardware or software that can perform the indicated functions, including computers (e.g., notebooks, desktops, netbooks, handhelds, etc.), network devices, Internet appliances, set top boxes, PDAs, wireless phones, smartphones, touchscreen devices, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally, a computer-accessible medium may include a computer-accessible storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
    performing, by one or more computers:
        determining that a first unit has been stowed in a particular inventory location of a materials handling facility that comprises a plurality of inventory locations;
        in response to that determination, evaluating a region comprising one or more of the plurality of inventory locations including the particular inventory location in order to determine whether the region comprises a unit designated to be picked from inventory; and
        in response to determining that the region comprises a particular unit designated to be picked from inventory, generating an instruction to pick the particular unit from a respective location within the region, wherein the particular unit is different from the first unit.

2. The computer-implemented method of claim 1, wherein the particular unit specified by the instruction is located within the particular inventory location in which the first unit was stowed.

3. The computer-implemented method of claim 1, wherein said region comprises only one inventory location, wherein that inventory location is the particular inventory location in which said first unit was stowed.

4. The computer-implemented method of claim 1, wherein the region evaluated comprises multiple inventory locations including the particular inventory location in which said first unit was stowed and one or more other inventory locations proximate to the particular inventory location.

5. The computer-implemented method of claim 4, wherein the first unit is stowed in a bin of a storage module comprising multiple bins, wherein said multiple inventory locations of the region are bins of the storage module.

6. The computer-implemented method of claim 1, further comprising providing the instruction to a mobile communication device associated with an agent that performed the stowing of the first unit in the particular inventory location.

7. The computer-implemented method of claim 1, wherein said first unit is obtained from a conveyable receptacle of a group of conveyable receptacles, wherein said instruction is generated subsequent to determining that at least one of the receptacles of the group is designated to hold items picked from inventory of the materials handling facility.

8. The computer-implemented method of claim 7, wherein the group of conveyable receptacles is located on a conveyable cart configured to be moved to multiple locations within the materials handling facility.

9. The computer-implemented method of claim 1, wherein the method further comprises generating an instruction to move the picked unit into a conveyable receptacle destined for a particular destination within the materials handling facility, wherein the particular destination is associated with a respective process performed within the materials handling facility.

10. A computer-implemented method, comprising:
performing, by one or more computers:
determining that a first unit has been picked from a given inventory location of a materials handling facility that comprises a plurality of inventory locations, wherein the first unit is placed in a receptacle of a plurality of conveyable receptacles subsequent to being picked;
in response to that determination, evaluating contents of the plurality of conveyable receptacles to determine whether the plurality of conveyable receptacles comprises a unit designated to be stowed into inventory; and
in response to determining that the plurality of conveyable receptacles comprises a given unit designated to be stowed into inventory, generating an instruction to stow the given unit into an inventory location.

11. The computer-implemented method of claim 10, wherein the instruction indicates the given unit is to be stowed in said given inventory location from which the first unit was picked.

12. The computer-implemented method of claim 10, wherein the instruction indicates the given units is to be stowed at an inventory location selected from a particular region, the region comprising the given inventory location from which the first unit was picked and one or more inventory locations proximate to the given inventory location.

13. The computer-implemented method of claim 10, wherein the plurality of receptacles are located on a conveyable cart configured to be moved to multiple locations within the materials handling facility.

14. The computer-implemented method of claim 10, wherein the first unit is picked from a bin of a storage module comprising multiple bins, wherein the instruction specifies that the given unit is to be stowed in a bin of that storage module.

15. The computer-implemented method of claim 10, further comprising:
determining that a second unit has been stowed in a specific inventory location of the materials handling facility;
in response to that determination, evaluating a region comprising one or more of the plurality of inventory locations including the specific inventory location to determine whether the region comprises an other unit designated to be picked from inventory; and
in response to determining that the region comprises an other unit designated to be picked from inventory, generating an instruction to pick the other unit from a respective location within the region.

16. A system, comprising:
a memory; and
one or more processors coupled to the memory, wherein the memory comprises program instructions executable by the one or more processors to implement a process control component configured to:
determine that a first unit has been stowed in a particular inventory location of a materials handling facility that comprises a plurality of inventory locations;
in response to that determination, evaluate a region comprising one or more of the plurality of inventory locations including the particular inventory location in order to determine whether the region comprises a unit designated to be picked from inventory; and
in response to determining that the region comprises a particular unit designated to be picked from inventory, generating an instruction to pick the particular unit from a respective location within the region, wherein the particular unit is different from the first unit.

17. The system of claim 16, wherein the particular unit specified by the instruction is located within the particular inventory location in which the first unit was stowed.

18. The system of claim 16, wherein said region comprises only one inventory location, wherein that inventory location is the particular inventory location in which said first unit was stowed.

19. The system of claim 16, wherein the region evaluated comprises multiple inventory locations including the particular inventory location in which said first unit was stowed and one or more other inventory locations proximate to the particular inventory location.

20. The system of claim 19, wherein the first unit is stowed in a bin of a storage module comprising multiple bins, wherein said multiple inventory locations of the region are bins of the storage module.

21. The system of claim 16, wherein the process control component is configured to provide the instruction to a mobile communication device associated with an agent that performed the stowing of the first unit in the particular inventory location.

22. The system of claim 16, wherein said first unit is obtained from a conveyable receptacle of a group of conveyable receptacles, wherein the process control component is configured to generate said instruction subsequent to determining that at least one of the receptacles of the group is designated to hold items picked from inventory of the materials handling facility.

23. The system of claim 22, wherein the group of conveyable receptacles is located on a conveyable cart configured to be moved to multiple locations within the materials handling facility.

24. The system of claim 16, wherein process control component is configured to generate an instruction to move the picked unit into a conveyable receptacle destined for a particular destination within the materials handling facility, wherein the particular destination is associated with a respective process performed within the materials handling facility.

25. A system, comprising:
a memory; and
one or more processors coupled to the memory, wherein the memory comprises program instructions executable by the one or more processors to implement a process control component configured to:
determine that a first unit has been picked from a given inventory location of a materials handling facility that comprises a plurality of inventory locations, wherein the first unit is placed in a receptacle of a plurality of conveyable receptacles subsequent to being picked;

in response to that determination, evaluate contents of the plurality of conveyable receptacles to determine whether the plurality of conveyable receptacles comprises a unit designated to be stowed into inventory; and in response to determining that the plurality of conveyable receptacles comprises a given unit designated to be stowed into inventory, generate an instruction to stow the given unit into an inventory location.

26. The system of claim 25, wherein the instruction indicates the given unit is to be stowed in said given inventory location from which the first unit was picked.

27. The system of claim 25, wherein the instruction indicates the given units is to be stowed at an inventory location selected from a particular region, the region comprising the given inventory location from which the first unit was picked and one or more inventory locations proximate to the given inventory location.

28. The system of claim 25, wherein the plurality of receptacles are located on a conveyable cart configured to be moved to multiple locations within the materials handling facility.

29. The system of claim 25, wherein the first unit is picked from a bin of a storage module comprising multiple bins, wherein the instruction specifies that the given unit is to be stowed in a bin of that storage module.

30. The system of claim 25, wherein the process control component is configured to:
   determine that a second unit has been stowed in a specific inventory location of the materials handling facility;
   in response to that determination, evaluate a region comprising one or more of the plurality of inventory locations including the specific inventory location to determine whether the region comprises an other unit designated to be picked from inventory; and
   in response to determining that the region comprises an other unit designated to be picked from inventory, generate an instruction to pick the other unit from a respective location within the region.

31. A computer-readable storage medium, storing program instructions computer-executable on a computer system to implement a process control component configured to:
   determine that a first unit has been stowed in a particular inventory location of a materials handling facility that comprises a plurality of inventory locations;
   in response to that determination, evaluate a region comprising one or more of the plurality of inventory locations including the particular inventory location in order to determine whether the region comprises a unit designated to be picked from inventory; and
   in response to determining that the region comprises a particular unit designated to be picked from inventory, generating an instruction to pick the particular unit from a respective location within the region, wherein the particular unit is different from the first unit.

32. The medium of claim 31, wherein the particular unit specified by the instruction is located within the particular inventory location in which the first unit was stowed.

33. The medium of claim 31, wherein said region comprises only one inventory location, wherein that inventory location is the particular inventory location in which said first unit was stowed.

34. The medium of claim 31, wherein the region evaluated comprises multiple inventory locations including the particular inventory location in which said first unit was stowed and one or more other inventory locations proximate to the particular inventory location.

35. The medium of claim 34, wherein the first unit is stowed in a bin of a storage module comprising multiple bins, wherein said multiple inventory locations of the region are bins of the storage module.

36. The medium of claim 31, wherein the process control component is configured to provide the instruction to a mobile communication device associated with an agent that performed the stowing of the first unit in the particular inventory location.

37. The medium of claim 31, wherein said first unit is obtained from a conveyable receptacle of a group of conveyable receptacles, wherein the process control component is configured to generate said instruction subsequent to determining that at least one of the receptacles of the group is designated to hold items picked from inventory of the materials handling facility.

38. The medium of claim 37, wherein the group of conveyable receptacles is located on a conveyable cart configured to be moved to multiple locations within the materials handling facility.

39. The medium of claim 31, wherein process control component is configured to generate an instruction to move the picked unit into a conveyable receptacle destined for a particular destination within the materials handling facility, wherein the particular destination is associated with a respective process performed within the materials handling facility.

40. A computer-readable storage medium, storing program instructions computer-executable on a computer system to implement a process control component configured to:
   determine that a first unit has been picked from a given inventory location of a materials handling facility that comprises a plurality of inventory locations, wherein the first unit is placed in a receptacle of a plurality of conveyable receptacles subsequent to being picked;
   in response to that determination, evaluate contents of the plurality of conveyable receptacles to determine whether the plurality of conveyable receptacles comprises a unit designated to be stowed into inventory; and
   in response to determining that the plurality of conveyable receptacles comprises a given unit designated to be stowed into inventory, generate an instruction to stow the given unit into an inventory location.

41. The medium of claim 40, wherein the instruction indicates the given unit is to be stowed in said given inventory location from which the first unit was picked.

42. The medium of claim 40, wherein the instruction indicates the given units is to be stowed at an inventory location selected from a particular region, the region comprising the given inventory location from which the first unit was picked and one or more inventory locations proximate to the given inventory location.

43. The medium of claim 40, wherein the plurality of receptacles are located on a conveyable cart configured to be moved to multiple locations within the materials handling facility.

44. The medium of claim 40, wherein the first unit is picked from a bin of a storage module comprising multiple bins, wherein the instruction specifies that the given unit is to be stowed in a bin of that storage module.

45. The medium of claim 40, wherein the process control component is configured to:
   determine that a second unit has been stowed in a specific inventory location of the materials handling facility;
   in response to that determination, evaluate a region comprising one or more of the plurality of inventory locations including the specific inventory location to determine whether the region comprises an other unit designated to be picked from inventory; and in response to determining that the region comprises an other unit designated to be picked from inventory, generate an instruction to pick the other unit from a respective location within the region.

\* \* \* \* \*